United States Patent [19]
Napoli et al.

[11] Patent Number: 5,321,949
[45] Date of Patent: Jun. 21, 1994

[54] STAGED FUEL DELIVERY SYSTEM WITH SECONDARY DISTRIBUTION VALVE

[75] Inventors: Phillip D. Napoli, West Chester; Thomas C. Campbell, Glendale, both of Ohio

[73] Assignee: General Electric Company, Cincinnati, Ohio

[21] Appl. No.: 729,238

[22] Filed: Jul. 12, 1991

[51] Int. Cl.⁵ .............................................. F02L 1/00
[52] U.S. Cl. ........................................ 60/739; 60/741
[58] Field of Search ............... 60/733, 734, 739, 740, 60/746, 741

[56] References Cited

U.S. PATENT DOCUMENTS

| | | | |
|---|---|---|---|
| 3,750,396 | 8/1973 | Tucker | 60/39.74 R |
| 3,774,851 | 11/1973 | Simmons | 239/551 |
| 3,775,975 | 12/1973 | Stenger et al. | 60/39.32 |
| 3,949,775 | 4/1976 | Cornell | 137/118 |
| 4,027,473 | 6/1977 | Baker | 60/39.28 R |
| 4,402,184 | 9/1983 | Faulkner et al. | 60/739 |
| 4,411,137 | 10/1983 | Pearce | 60/739 |
| 4,467,610 | 8/1984 | Pearson et al. | 60/739 |
| 4,499,735 | 2/1985 | Moore et al. | 60/739 |
| 4,590,768 | 5/1986 | Halvorsen et al. | 60/741 |
| 4,817,389 | 4/1989 | Holladay et al. | 60/739 |
| 5,036,657 | 8/1991 | Seto et al. | 60/739 |

FOREIGN PATENT DOCUMENTS 1006549 4/1952 France .
2206159A 12/1988 United Kingdom .

*Primary Examiner*—Richard A. Bertsch
*Assistant Examiner*—William Wicker
*Attorney, Agent, or Firm*—Jerome C. Squillaro; James P. Davidson

[57] ABSTRACT

A fuel delivery system for a turbine engine having a primary fuel flow circuit and a secondary fuel flow circuit. The primary fuel flow circuit has a unstaged-first manifold and a staged-second manifold. A control valve and flow meter regulate the amount of fuel flow to the unstaged and staged manifolds with a first mode of operation providing fuel to the unstaged manifold only, and a second mode of operation providing fuel to both the staged and unstaged manifolds. When high power is required of the engine, a secondary fuel circuit is provided with a secondary manifold which is connected to a distribution valve which opens when fuel flow is at a predetermined level. The invention allows fuel to be efficiently atomized at various levels of powered operation by having a control center which controls the opening and closing of the distribution valve and control valve based upon fuel flow rates fuel/air ratios and air start core speed.

6 Claims, 3 Drawing Sheets

STAGED FUEL DELIVERY SYSTEM WITH SECONDARY DISTRIBUTION VALVE

The present invention relates to fuel system components of turbofan gas turbine aircraft engines. More particularly, the present invention pertains to a fuel delivery system for gas turbine engines having a primary circuit and a secondary circuit and in which the primary circuit includes an unstaged manifold and a staged manifold. The primary circuit is a high pressure drop system which achieves an efficient atomization of fuel (i.e., good combustion and low emissions) at starting and low speeds. The primary circuit has a staging valve which determines whether both the unstaged and staged manifold are to be concurrently utilized. The staging valve opens and closes as a function of a calculated fuel air ratio and air start core speed.

The secondary circuit is utilized when extra power is necessitated such as during takeoff. The secondary circuit is a low pressure drop system which achieves efficient atomization of fuel during conditions of high fuel flow. The secondary circuit is comprised of a secondary manifold which is connected to a secondary distribution valve which opens and closes based on fuel flow rate and/or pressure.

BACKGROUND OF THE INVENTION

Two key requirements affect the design of fuel system components of advanced/increased thrust turbofan aircraft engines. First, the fuel system must accommodate successful windmill airstarts at 10% core speed and 200 knot flight speed. Second, the fuel system must allow a satisfactory fuel pump discharge pressure at high takeoff fuel flows. The windmill start requirement establishes the physical size/flow capacity of the fuel pump while the fuel system component pressure drop and nozzle discharge pressure for fuel flow during takeoff set the pump maximum discharge pressure. Under the fuel system design concepts which have heretofore been utilized by industry, pump capacity must be increased and component pressure drops must be reduced to satisfy fuel system design standards. Since the fuel nozzle is the major contributor to fuel system pressure constraints, this component is a likely candidate for a design pressure reduction. Increasing the pump flow capacity is a relatively easy task; however, reducing the fuel nozzle pressure requirements for a conventionally configured fuel nozzle/manifold system to a level that satisfies pump discharge requirements is not possible without impacting engine efficiency and idle emission levels. For this reason, a new fuel delivery system concept is necessitated.

SUMMARY OF THE INVENTION

One object of the present invention is to provide a primary circuit having a first, unstaged manifold and a second, staged manifold which provide efficient fuel atomization at low and idle speeds.

Another object of the present invention is to provide a staging valve connected to both manifolds of the primary circuit which allocates fuel such that the reduced amount of fuel, necessitated for deceleration and decent, is realized while avoiding lean blowout of the nozzle flame.

Another object of the present invention is to provide a secondary circuit having a secondary manifold which provides efficient fuel atomization when high power levels are necessitated.

Another object of the present invention is to negate the need for pressure actuated flow divider valves in each fuel nozzle of the turbine engine by utilizing a secondary flow valve for controlling secondary flow to fuel nozzles at high power settings.

Still another object of the present invention is to reduce the pump discharge pressure requirements in the fuel pumps of gas turbine aircraft engines.

These and other valuable objects and advantages of the present invention are accomplished by a fuel delivery system for a gas turbine engine having a primary flow system having a first manifold and a second manifold and a plurality of fuel nozzles connected to the first and second manifolds, respectively. The delivery system further comprises a secondary fuel flow system having another manifold with another plurality of fuel nozzles connected thereto. A first control valve connected in a fuel flow path to the primary fuel flow system can be operative in a first mode for coupling fuel into the first manifold. Also, the control valve can be operated in a second mode for coupling fuel into both the first and second manifolds. Further, a second flow control valve is connected in a fuel flow path to the secondary fuel flow system, the second valve being responsive to a preselected total flow rate for coupling fuel to said another manifold. The first control valve is equipped with means for coupling fuel to the first manifold at a pressure sufficient to develop atomized fuel at the nozzles connected to said first manifold. Further, the first control valve has means for coupling fuel to both the first and second manifolds at a pressure sufficient to develop atomized fuel at the nozzles connected to both the first and second manifolds. The second flow control valve has means for coupling fuel to said another manifold at a pressure sufficient to develop atomized fuel at the nozzles connected to said another manifold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Figure 1:
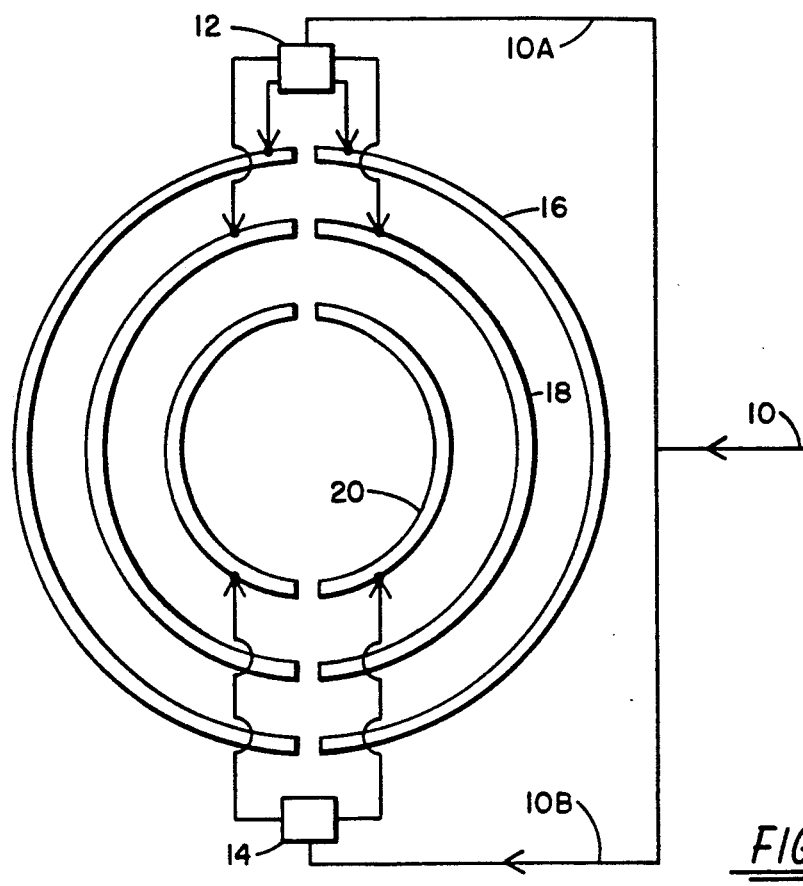
FIG. 1 is a simplified schematic illustration of the two primary manifolds, staging valve, single secondary manifold, and secondary distribution valve of the present invention.

When referring to the drawings, it should be understood that like reference numerals designate identical or corresponding parts throughout the respective figures.

With reference to FIG. 1, there is shown a simplified schematic representation of a fuel flow arrangement 10 for a gas turbine engine divided into a primary fuel flow path 10A and a secondary fuel flow path 10B. Primary fuel flow path 10A is coupled to staging valve 12 while secondary fuel flow path 10B is coupled to secondary distribution valve 14. Staging valve 12 is connected to an unstaged, primary manifold 16 and to a staged, primary manifold 18. Secondary distribution valve 14 is connected to secondary manifold 20. The staging valve 12 and secondary distribution valve 14 control the amount of fuel flow to primary manifolds 16, 18 and secondary manifold 20, respectively. While each manifold is illustrated as comprising two 180° sections, it will be recognized that each manifold could be formed as a continuous 360° section or be divided into further smaller sections. The manifolds 16, 18, and 20 convey fuel to a plurality of fuel nozzle assemblies 26 (see FIG. 2) arranged to spray fuel into a combustor stage (not shown) of a gas turbine engine. The fuel is mixed with air and ignited in the combustor stage to generate a high energy gas stream, which stream is directed into a turbine stage (not shown) where the gas stream energy is converted to rotational motion of the turbine blades in the turbine engine. The manner by which fuel flow is controlled shall be subsequently discussed.

Figure 2:
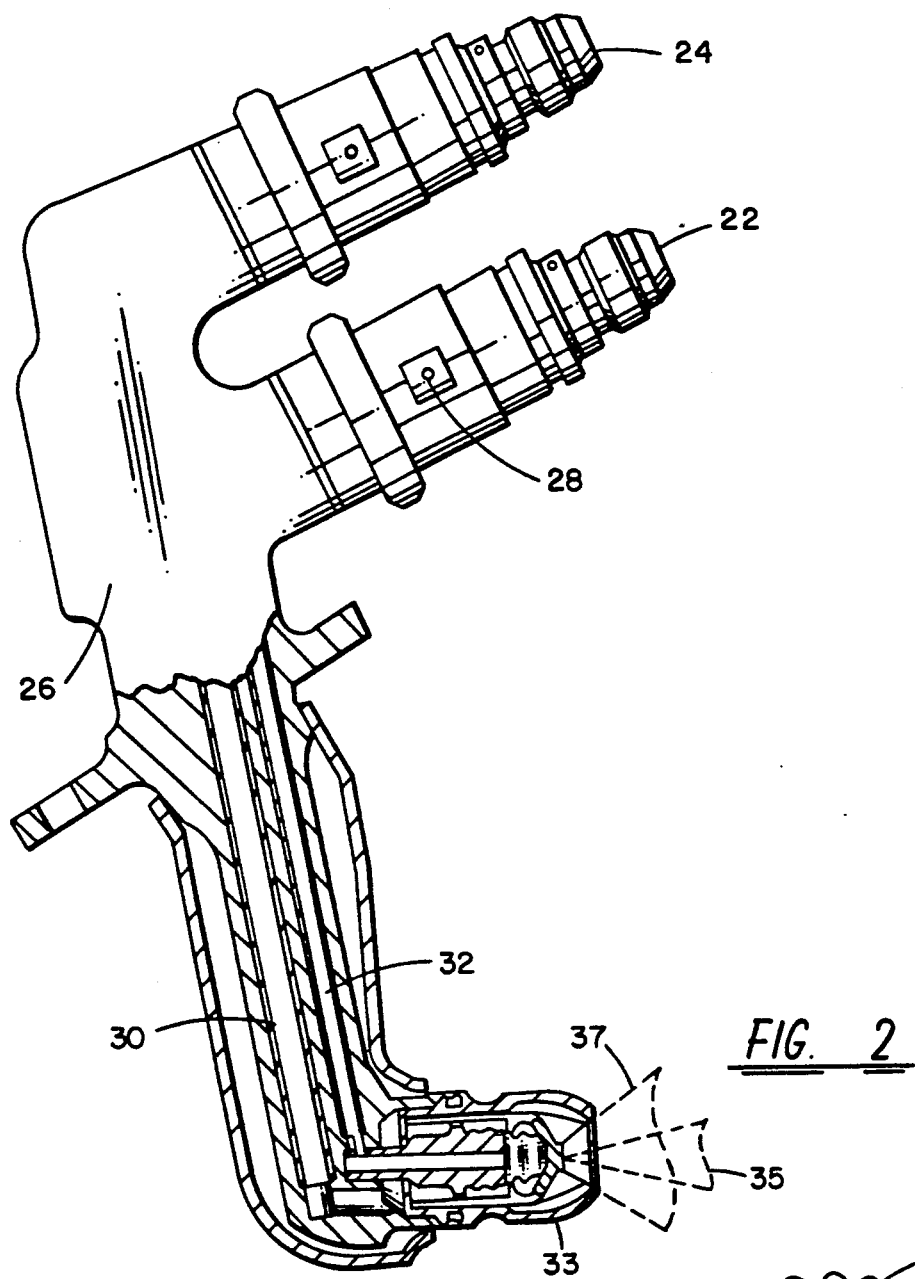
FIG. 2 is a schematic illustration partly in cross-section and partly broken away of the secondary and primary circuits of a nozzle of the present invention and the secondary and primary inlet fittings of said nozzle.

In FIG. 2, primary nozzle inlet fitting 22 and secondary nozzle inlet fitting 24 project from a nozzle assembly 26. The unstaged, primary manifold 16 is connected to the primary inlet fitting 22 of a preselected number of nozzle assemblies 26, preferably one-half of the total number of nozzle assemblies. In an exemplary thirty nozzle assembly engine combustor, fifteen nozzles would be desirably coupled to manifold 16. Likewise, the staged, primary manifold 18 is connected to the primary inlet fitting 22 of the remaining fifteen nozzle assemblies 26. Secondary manifold 20 is connected to the secondary inlet fitting 24 of all thirty nozzle assemblies 26. As can be appreciated from FIG. 2, individual check valves 28 are located immediately downstream of primary nozzle inlet fitting 22 and secondary nozzle inlet fitting 24. These check valves have a crack pressure of 20 psi and prevent fuel accumulation in the combustor (not shown) when the engine shuts down. Furthermore, the check valves 28 allow fuel to be maintained in the manifolds so that the engine can be restarted immediately. Within the nozzle assembly 26, a secondary circuit fuel flow path 30 is connected to secondary nozzle inlet fitting 24 and a primary circuit fuel flow path 32 is connected to primary nozzle inlet fitting 22. All fuel nozzles 26 are the same whether connected to a staged or unstaged primary manifold. Both the primary fuel flow path 32 and secondary fuel flow path 30 terminate at the nozzle outlet 33. However, the primary fuel flow path 32 terminates at an orifice which forms a relatively narrow spray 35 while the secondary flow path 30 terminates in an orifice concentric about the primary orifice to form a broader spray pattern 37.

Figure 3:
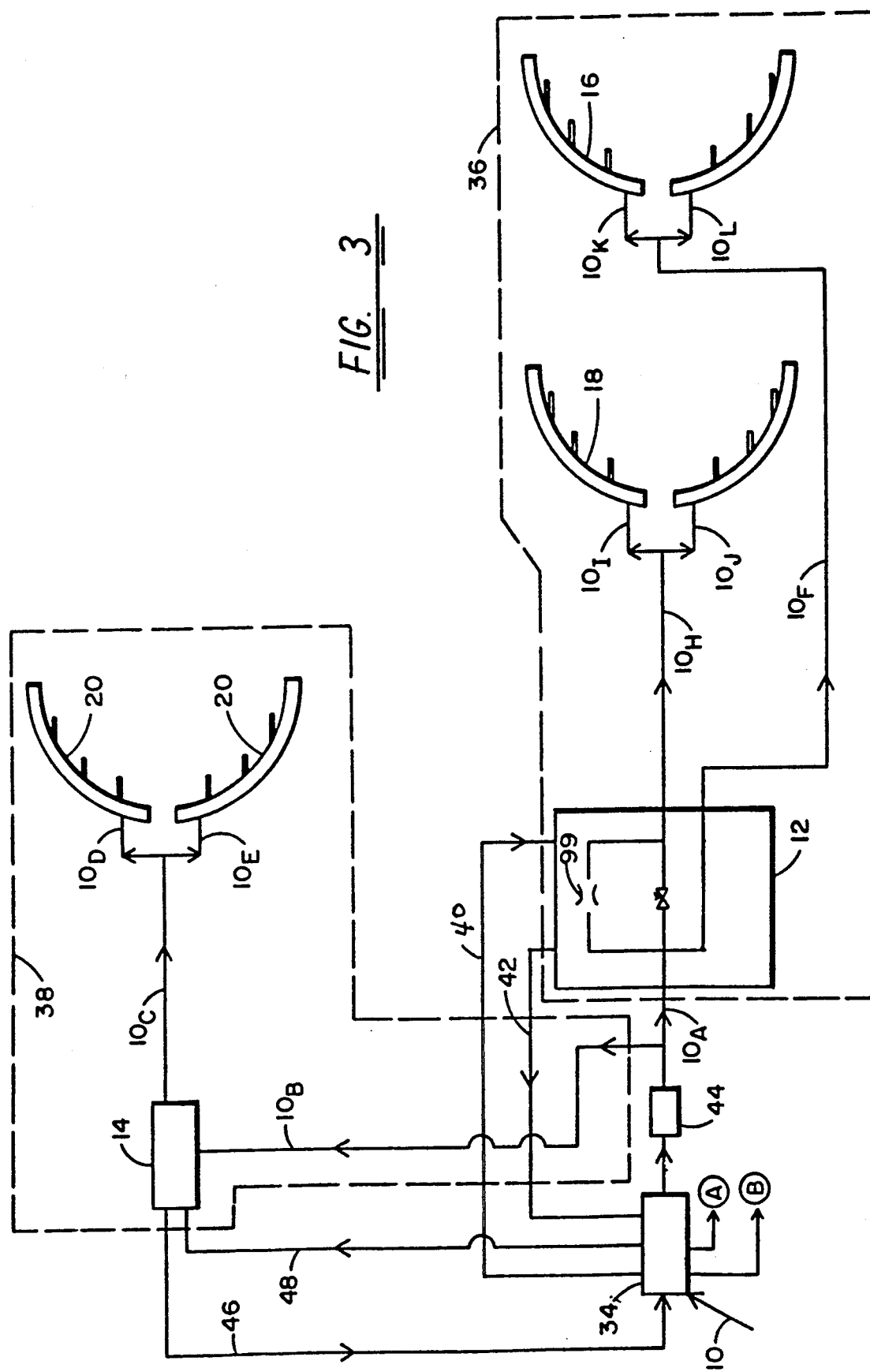
FIG. 3 is a simplified schematic illustration of the distribution valve, staging valve, and control center of the present invention.

With reference to FIG. 3, a control center 34 is operatively connected to primary fuel system 36 and secondary fuel system 38. Control center 34 is a computing means which can be electronic, hydraulic, pneumatic, or a combination thereof and which controls staging valve 12 and distribution valve 14. Primary system 36 is comprised of staging valve 12, which is in communication with control center 34, and staged and unstaged manifolds 16 and 18.

Staging valve 12 opens and closes as a function of calculated combustor fuel air ratio and air start core speed in accordance with preselected engine performance characteristics. Control center 34 performs the appropriate calculations. A high pressure fuel pump (not shown) sends fuel along line 10 to control center 34.

Control center 34 sends signal 40 to staging valve 12 and receives feedback signal 42 from staging valve 12. Staging valve 12 also includes a bypass orifice 99 for supplying a metered fuel flow to the staged manifold 18 during staged operations. The metered fuel flow is equal to the total fuel nozzle leakage of the nozzles connected to the staged manifold 18.

In the illustrative embodiment, the manifolds 16, 18, and 20 are sectioned such that fuel flow 10F to unstaged manifold 16 is divided into fuel flow 10K and fuel flow 10L. Fuel flow 10K supplies fuel to eight fuel nozzles of unstaged manifold 16 and fuel flow 10L supplies fuel to 7 fuel nozzles of unstaged manifold 16. During unstaged operations, the staging valve 12 supplies fuel 10H to the staged manifold 18. Fuel flow 10H is divided into fuel flow 10I and fuel flow 10J. Fuel flow 10I supplies eight fuel nozzles of manifold 18 and fuel flow 10J supplies seven nozzles of manifold 18.

The secondary system 38 comprises distribution valve 14 and secondary manifold 20. Control center 34 controls distribution valve 14 by means of signal 48 which is sent from control center 34 to distribution valve 14. Signal 46 from distribution valve 14 to control center 34 provides valve 14 status information to control center 34. When distribution valve 14 is open, fuel flow 10C proceeds from distribution valve 14 to manifold 20, dividing into fuel flows 10D and 10E to each section of the manifold. For the illustrative split manifold 20, fuel flow 10D supplies fifteen fuel nozzle assemblies 26 and fuel flow 10E supplies another fifteen fuel nozzle assemblies 26.

The distributor valve 14 has a differential pressure ($\Delta P$) flow schedule characteristic that is reduced by 260 psi over conventional flow divider valves used in the fuel nozzles of conventional systems.

Figure 4:
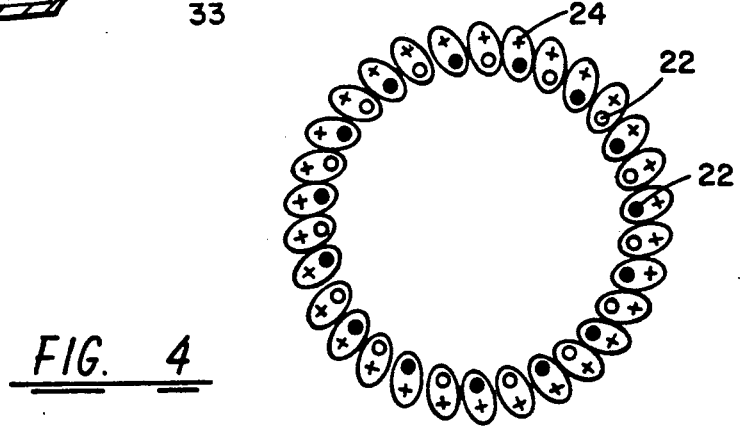
FIG. 4 is a schematic illustration showing the annular relationship between the nozzles of the staged, primary manifold, of the unstaged, primary manifold, and of the secondary manifold.

FIG. 4 illustrates the annular physical spatial relationship of the secondary nozzle inlets 24 of secondary manifold 20, primary nozzle inlets 22 of unstaged manifold 16, and primary nozzle inlets 22 of staged manifold 18 about an annular turbine combustor. The secondary manifold 20 supplies fuel to thirty secondary nozzle inlets 24 indicated by a small x. Manifold 16 supplies fuel to fifteen unstaged primary nozzle inlets 22 indicated by solid dots. Manifold 18 supplies fuel to fifteen staged primary nozzle inlets 22 indicated by hollow dots. In the preferred embodiment, the staged nozzles are alternated with the unstaged nozzles. Staged and unstaged nozzles 26 are identical, see FIG. 4. The fuel nozzles are of course located proximate to the fuel cells (not shown) of the combustor region (not shown) of the engine.

Figure 5:
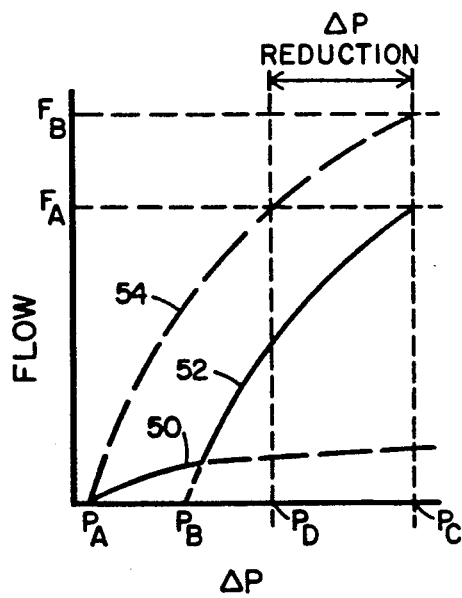
FIG. 5 is a graph which illustrates how the distribution valve of the present invention meters fuel to the secondary manifold realizing low ΔP at high flow.

FIG. 5 is a graph illustrating how the secondary flow distribution valve 14 opens and permits fuel flow which reduces valve back pressure. FIG. 5 plots fuel flow as a function of fuel nozzle pressure $\Delta P$. In a conventional system, the primary fuel valve opens at $P_A$, typically at about 20 psi, and only the primary valve supplies fuel following characteristic 50 until the fuel pump pressure reaches $P_B$, about 260 psi. At $P_B$, the secondary valve opens so that the total fuel flow follows characteristic 52. At least the pressure $P_B$ must be maintained by the pump just to keep the secondary valve open. The maximum fuel flow $F_A$ occurs at pressure $P_C$ corresponding to the maximum pump pressure capacity. In accordance with the present inventive system, the secondary valve opens at the same pressure $P_A$ as the primary valve so that the total fuel flow follows the characteristic 54. The obvious improvement is that flow capacity, limited by pump pressure capability, is significantly increased to flow $F_B$ without changing pump size. Alternately, if flow $F_A$ is satisfactory for a particular engine, this flow can be achieved at a lower pressure $P_D$ thus allowing pump size to be reduced. Note that pump discharge pressure is equal to the sum of pressure $P_3$, fuel nozzle pressure $\Delta P$ and fuel distribution valve 14 pressure differential.

Figure 6:
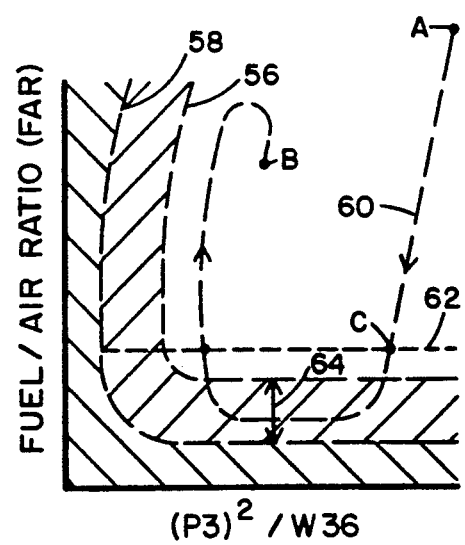
FIG. 6 is a graph which illustrates engine fuel/air ratio versus core speed and the added blow-out margin of the present invention.

FIG. 6 is a graph or combustor stability map which illustrates how the staged primary circuit arrangement of the present invention improves the added blow-out margin over systems requiring that all the nozzles of a system be fueled. The staged combustion system provides capability for lower deceleration schedules and quicker deceleration times as well as providing for lower steady state idle descent core turbomachinery speeds without flame-out. In FIG. 6, fuel air ratio (FAR) is plotted as a function of an engine combustion severity parameter, in this instance the parameter being the ratio of combustor input air pressure $P_3{}^2$ to total air flow $W_{36}$ through the combustor. Characteristic 56 represents the combustor lean stability limit for a uniform burn condition, i.e., combustor unstaged and all nozzles lit. The region to the left or below the line 56 represents an unstable region, i.e., a region where blow-out or flame-out may occur. The characteristic line 58 represents the lean stability limit for a stage combustor, i.e., only a preselected number of nozzles are lit and supplying fuel. Note that the effect of staging is to shift the stability characteristic closer to the axis lines thus providing a larger stable region.

In order to appreciate the advantage of the added stability region, reference is made to line 60 which represents a typical transient deceleration curve as an engine is transitioned from a high power mode (take-off and climb), point A, to a lower power mode at point B. When the throttle is moved to a lower power position, an on-board computer (control center 34) senses the new throttle position and translates that position into appropriate commands for fuel flow and fuel air ratio. At point C, the control center 34 senses that the engine characteristic has reached the preselected combustor FAR limit, line 62, and initiates a signal on line 40 to staging valve 12 to shut down fuel flow to manifold 18, thereby shifting the stability limit characteristic to line 58. This shifting creates an additional margin 64 allowing the engine characteristic 60 to fall below the prior unstaged burn characteristic 56. As the engine is progressively brought to the low power idle condition, point B, the characteristic 60 transitions back above the FAR unstaged combustion limit and the control center 34 again opens valve 12 to provide fuel to manifold 18 so that the combustor is again unstaged.

The above described characteristic response occurs during transient power change conditions and also may occur during cold weather descents when flight idle power is used. In either event, the ability to switch to a staged mode provides the added margin to at least minimize the possibility of transitioning through an unstable combustion region.

At start-up and idle speeds, the secondary manifold 20 may not be activated since fuel flow requirements are low and can be satisfied by the primary system. However, the staging valve 12 will open to supply fuel to the staged manifold 18 if the calculations of the control center determine that the calculated fuel/air ratio and air start core speed are such that the staging valve should be open.

The above detailed description is intended to be illustrative and non-limiting. Numerous changes and modifications are possible in light of the above teachings. It is therefore to be understood that the invention may be practiced otherwise than is specifically described herein and still be within the scope of the appended claims.

What is claimed is:

1. A fuel delivery system for a gas turbine engine, the engine having a combustor and a plurality of fuel nozzles selectively distributed for injecting fuel into the combustor, comprising:
   a primary manifold coupled to preselected ones of said fuel nozzles for delivering fuel thereto;
   a secondary manifold coupled to preselected ones of said fuel nozzles for delivering fuel thereto;
   a distribution valve connected in a fuel flow path to said secondary manifold;
   control means connected to said distribution valve for operating said distribution valve as a function of a fuel flow rate determined by said control means in response to engine power demand; and
   each of said nozzles including a check valve and each of said check valves in said predetermined ones of said nozzles coupled to said secondary manifold opening at substantially the same pressure as said check valves in said nozzles coupled to said primary manifold.

2. The system of claim 1 wherein said primary manifold comprises a staged manifold and an unstaged manifold, said system further including means responsive to said control means for distributing fuel to said staged manifold and to said unstaged manifold as a function of calculated fuel-to-air ratio and air start core speed.

3. A system according to claim 2 wherein said means for distributing comprises a staging valve for selectively coupling fuel to said staged manifold.

4. A fuel delivery system for a gas turbine engine, the engine including a combustor and a plurality of fuel nozzles positioned for injecting fuel into the combustor comprising:
   a primary fuel flow system having a first manifold and a second manifold, each of said first and second manifolds being connected for supplying fuel to corresponding groups of the fuel nozzles;
   a secondary fuel flow system including a third manifold coupled to supply fuel to corresponding ones of the fuel nozzles;
   a first flow control valve connected in a fuel flow path to said primary fuel flow system, said valve being operative in a first mode for coupling fuel into said first and second manifolds and in a second mode for coupling fuel only into said first manifold; and
   a second flow control valve connected in a fuel flow path to said secondary fuel flow system, said second valve being responsive to a preselected total flow rate for coupling fuel into said third manifold.

5. A system according to claim 4 further comprising:
a crack pressure check valve in each of said nozzles of said primary and secondary fuel flow systems, each of said check valves being responsive to a preselected low pressure for transitioning to an open position.

6. A system according to claim 5 wherein:
said preselected low pressure is about 20 pounds per square inch.

* * * * *